(12) United States Patent
Lenzing

(10) Patent No.: US 6,705,159 B2
(45) Date of Patent: Mar. 16, 2004

(54) PROTECTIVE DEVICE FOR A MASS FLOW SENSOR DISPOSED IN AN AIR INTAKE CHANNEL

(75) Inventor: Thomas Lenzing, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,738

(22) PCT Filed: Mar. 31, 2001

(86) PCT No.: PCT/DE01/01279

§ 371 (c)(1),
(2), (4) Date: Jun. 5, 2002

(87) PCT Pub. No.: WO01/75402

PCT Pub. Date: Oct. 11, 2001

(65) Prior Publication Data

US 2002/0170363 A1 Nov. 21, 2002

(30) Foreign Application Priority Data

Apr. 4, 2000 (DE) .......................... 100 16 642

(51) Int. Cl.$^7$ ................................ G01F 1/68
(52) U.S. Cl. .................... 73/202.5; 73/204.21
(58) Field of Search ................ 73/202, 202.5, 73/204.21, 861.19

(56) References Cited

U.S. PATENT DOCUMENTS

| | | | | | |
|---|---|---|---|---|---|
| 4,449,401 A | * | 5/1984 | Kaiser et al. | ............... | 73/202.5 |
| 4,457,169 A | * | 7/1984 | Lauterbach et al. | ....... | 73/202.5 |
| 4,709,581 A | * | 12/1987 | Nishimura et al. | ........... | 73/202 |

FOREIGN PATENT DOCUMENTS

| | | | |
|---|---|---|---|
| DE | 19632198 | * | 3/1998 |
| JP | 11166719 | * | 6/1999 |

* cited by examiner

*Primary Examiner*—Harshad Patel
(74) *Attorney, Agent, or Firm*—Ronald E. Greigg

(57) ABSTRACT

Known devices for measuring the mass of a flowing medium can be impaired in their measurement precision by fluid components carried along in the medium. The device according to the invention has a ricochet body, which is disposed upstream of the measuring element and is at least partially encompassed by an outer ring, where the outer ring constitutes a section inside the outer ring that tapers in the flow direction in order to deflect fluid components, which are carried along in the flow, away from the measuring element by means of the ricochet body. The device is useful for measuring the mass of a flowing medium, in particular for measuring the intake air mass of internal combustion engines.

12 Claims, 1 Drawing Sheet

PROTECTIVE DEVICE FOR A MASS FLOW SENSOR DISPOSED IN AN AIR INTAKE CHANNEL

CROSS-REFERENCE TO RELATED APPLICATIONS

This application is a 35 U.S.C. 371 application of PCT/DE 01/01279 filed on Mar. 31, 2001.

FIELD OF THE INVENTION

The invention is directed to an improved device for determining at least one parameter of a flowing medium and more particularly to such a device for measuring a parameter of the intake air of an internal combustion engine.

DESCRIPTION OF THE PRIOR ART

A device is already known (DE-OS 35 15 206), in which a capturing element is provided in the vicinity of a measuring element in a measurement conduit of the device, in order to prevent dirt particles in the air flow from adhering to the measuring element. The specified accommodation of the capturing element in the vicinity of the measuring element produces a leeward area downstream of the capturing element, which is intended to prevent dirt particles from adhering to the measuring element. However, when there are fluid components carried along with the air flow, a condensation on the measuring element can occur, which leads to a disadvantageous change in the characteristic curve of the device and in its measuring precision.

EP 0 967 466 A1 has disclosed a device in which a damming body is used to generate eddies. However, this leads to increased measurement signal noise in the measuring element.

DE 196 32 198 A1 has disclosed a device in which a ricochet device is accommodated upstream of the device, in a section of the flow line that tapers in the flow direction of the medium.

In this instance, the form of the line must be especially adapted in order to form the tapering section. Due to the deviation from the standard geometry, this leads to increased costs.

SUMMARY OF THE INVENTION

The device according to the invention for determining at least one parameter of a flowing medium has the advantage over the prior art that in particular fluid components of the air flow are prevented from adhering to the measuring element so that a constantly precise measurement result can be achieved.

It has turned out that in particular, a prismatic embodiment of a ricochet body advantageously achieves a particularly effective diversion of fluid components carried along in the air stream.

If the outer ring extends from the ricochet body to the measurement housing, the measuring element can be advantageously protected from contaminants coming from the line.

BRIEF DESCRIPTION OF THE DRAWINGS

An exemplary embodiment of the invention is shown in a simplified fashion in the drawings and will be explained in detail herein below, with reference to the drawings, in which.

DESCRIPTION OF THE PREFERRED EMBODIMENT

Figure 1:
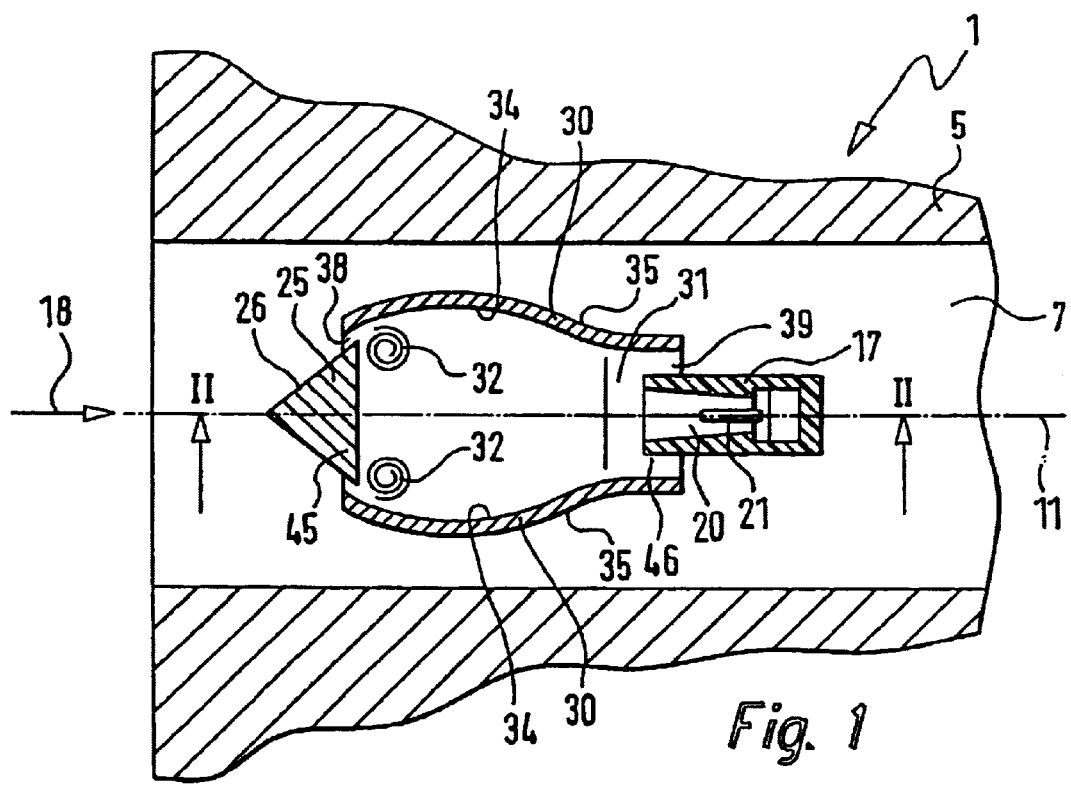
FIG. 1 shows a cross section through a device with a ricochet body and an outer ring.

FIG. 1 shows a cross section through a device labeled 1, which is used to determine at least one parameter of a flowing medium, in particular the intake air of internal combustion engines. The engine can be a mixture-compressing engine with externally supplied ignition or can also be an air-compressing, auto-ignition engine. As shown in detail in FIG. 2, which is a longitudinal section along a line II—II in FIG. 1, a measuring body 17 preferably has a slim, bar-shaped, block form, which extends longitudinally in the direction of an insertion axis 10, and is inserted, e.g. in a sliding fashion, into an opening 6 of an intake line 7 that constitutes a flow line, which opening is let into a wall 5. For example, the wall 5, which is indicated by cross-hatching, is part of the for example cylindrically embodied intake line 7, through which a medium flows, in particular the air aspirated by the internal combustion engine. The wall 5 of the intake line 7 defines a flow cross section, which in the case of the cylindrical intake line 7, for example, has a circular cross section, in the center of which a central axis 11 extends in the direction of the flowing medium parallel to the wall 5 and is oriented perpendicular to the insertion axis 10. The direction of the flowing medium is indicated in FIGS. 1 and 2 by means of corresponding arrows 18 and runs from left to right there.

The measuring body 17 protrudes into the flowing medium and has a measuring conduit 20, which accommodates at least one measuring element 21 for determining at least one parameter of a medium flowing in the intake line 7. In this exemplary embodiment, a measuring element is used, which determines, for example, the volume flow of the flowing medium. Other parameters that can be measured include, for example, pressure, temperature, a concentration of a medium component, or a flow speed and are detected by means of suitable sensors.

The design of the measuring body 17 for determining a parameter of a flowing medium is sufficiently known to the expert, e.g. from DE-OS 44 07 209, whose disclosure is incorporated into the current patent application by reference. The measuring body 17, however, is not limited to this exemplary embodiment.

Figure 2:
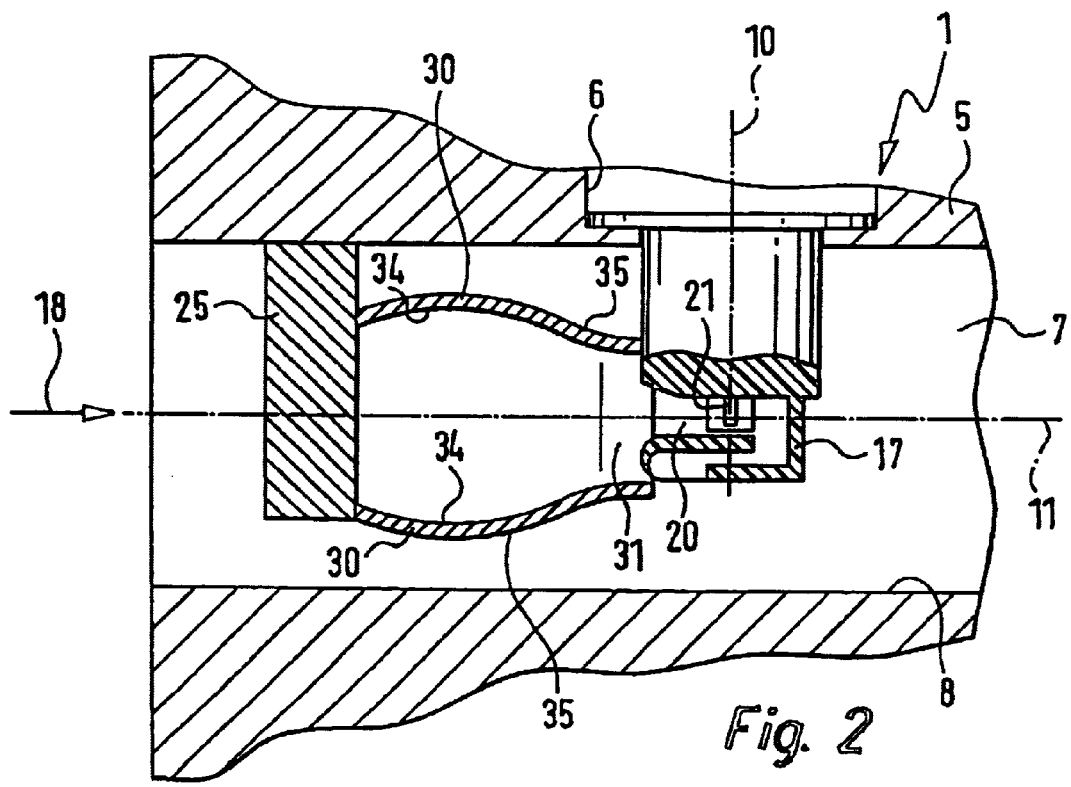
FIG. 2 shows a longitudinal section along a line II—II in FIG. 1, through the intake line with the device.

Upstream of the measuring element 21, a ricochet body 25 is accommodated in the intake line 7, whose form is embodied so that components carried along in the flow 18 of the medium, in particular those in a fluid form, are deflected from the middle of the intake line 7, which region is indicated by the central axis 11, essentially to a lower part of the wall 5, which region is labeled with the reference numeral 8 and is shown at the bottom in FIG. 2.

As shown in detail in FIG. 1, the vertically disposed ricochet body 25 has, for example, a prismatic form for this purpose, with an essentially triangular cross sectional area and a tip directed counter to the flow 18. The ricochet body 25 can also be aerodynamically shaped.

For example, an outer ring 30 is disposed extending from the downstream end 45 of the ricochet body 25 until or to an upstream beginning 46 of the measuring body 17. The outer ring 30 can be connected by means of struts (not shown) to the line 7 and/or to the ricochet body 25 and/or to the measuring body 17. In the flow direction 18 inside the outer ring 30, this outer ring 30 constitutes a tapering section 31 in which an increase in the flow speed of the medium or an acceleration occurs.

The outer ring 30 is disposed, for example, so that it partially encompasses, at a distance, an end surface 26 of the ricochet body 25 oriented toward the flow direction 18 and then, for example, becomes wider at first in the inner diameter, viewed in the flow direction 18, so that the flow, which is deflected outward by the ricochet body 25, does not strike an inner wall 34 of the outer ring 30 frontally or at an acute angle. Then the inner wall 34 of the outer ring 30 tapers, causing the gas to accelerate. The medium can flow through a first gap 38 between the ricochet body 25 and the outer ring 30 and through a second gap 39 between the measuring housing 17 and outer ring.

The circulation around the ricochet body 25 always causes flow separations and eddies 32 in the vicinity downstream of the downstream end 45 of the ricochet body 25. The eddies 32 are reduced in intensity by the section of the outer ring 30 that tapers in the main flow direction and by the attendant acceleration of the gas so that no increased measurement signal noise occurs in the measuring element 21.

Due to the fact that their inertia is considerably higher than that of the gas, fluid or solid particles in the line 7 that are entrained by the gas strike against the ricochet body and are deflected by it radially outward in the direction of the wall 5. Only seldom can solid particles get into the gap 38 and therefore into the tapering section 31, which is constituted by the outer ring 30, since the outer ring 30 extends from the ricochet body 25 to the measuring housing 17.

Those solid particles that do penetrate into this region, though, are deflected past the measuring conduit 20 by being reflected against the inner wall 34 of the outer ring 30.

Due to its much greater dynamic viscosity, fluid that strikes against the ricochet body 25 then forms a wall film on the ricochet body; this wall film is distributed on the inside 34 and outside 35 of the outer ring 30 and therefore does not travel into the conduit 20.

The outer ring 30 is embodied as streamlined and, for example, is S-shaped.

The foregoing relates to preferred exemplary embodiments of the invention, it being understood that other variants and embodiments thereof are possible within the spirit and scope of the claims, the latter being defined by the appended claims.

I claim:

1. A device for determining at least one parameter of a medium flowing in a line, which medium is in the form of a gas/fluid mixture, in particular the intake air of internal combustion engines, comprising a measurement housing (17) provided in the line, at least one measuring element (21) disposed in the measurement housing and around the measurement housing and measuring element the flowing medium circulates, the measuring element being operable to determine parameters of the medium flowing in the line, a ricochet body (25) disposed upstream of the measuring element, an outer ring (30) disposed at least partially between the ricochet body (25) and the measurement housing (17), and a tapering section (31) inside the outer ring (30) constituted by the outer ring (30).

2. The device according to claim 1, wherein the ricochet body (25) is prismatic in form.

3. The device according to claim 1, wherein the ricochet body (25) is aerodynamically formed.

4. The device according to claim 1, wherein the outer ring (30) is aerodynamically formed.

5. The device according to claim 4, wherein the outer ring (30) at least partially encompasses the ricochet body (25), at a distance (38).

6. The device according to claim 4, wherein the outer ring (30) at least partially encloses the measurement housing (17), at a distance.

7. The device according to claim 1, wherein the outer ring (30) is embodied as S-shaped.

8. The device according to claim 7, wherein the outer ring (30) at least partially encompasses the ricochet body (25), at a distance (38).

9. The device according to claim 7, wherein the outer ring (30) at least partially encloses the measurement housing (17), at a distance.

10. The device according to claim 1, wherein the outer ring (30) at least partially encompasses the ricochet body (25), at a distance (38).

11. The device according to claim 10, wherein the outer ring (30) at least partially encloses the measurement housing (17), at a distance.

12. The device according to claim 1, wherein the outer ring (30) at least partially encloses the measurement housing (17), at a distance.

* * * * *